United States Patent [19]

Kuse et al.

[11] Patent Number: 5,051,319

[45] Date of Patent: Sep. 24, 1991

[54] MAGNETIC RECORDING TAPE CONTAINING LOW LEVELS OF COMPOUNDS WITH MOLECULAR WEIGHTS BETWEEN SPECIFIED LIMITS DETERMINED FROM GEL PERMEATION CHROMATOGRAPHY OF TAPE EXTRACT

[75] Inventors: Sadamu Kuse, Minoo; Kimihiko Kaneno, Nagaokakyo; Seigi Kawarai, Ashiya, all of Japan

[73] Assignee: Hitachi Maxell, Ltd., Osaka, Japan

[21] Appl. No.: 477,444

[22] Filed: Feb. 9, 1990

[30] Foreign Application Priority Data

Feb. 11, 1989 [JP] Japan ................... 1-31738

[51] Int. Cl.$^5$ .............................................. G11B 23/00
[52] U.S. Cl. ...................................... 428/694; 428/900
[58] Field of Search ............................... 428/694, 900

[56] References Cited

U.S. PATENT DOCUMENTS 4,210,703  7/1980  Scantlin et al. ..................... 428/413
4,313,989  2/1982  Suzuki et al. ........................ 428/64

Primary Examiner—Merrell C. Cashion, Jr.
Assistant Examiner—Stevan A. Resan
Attorney, Agent, or Firm—Birch, Stewart, Kolasch & Birch

[57] ABSTRACT

A magnetic recording tape comprising a non-magnetic substrate, a magnetic layer which comprises magnetic powder and a binder resin coated on one surface of the substrate and a back coating layer which comprises non-magnetic powder and a binder resin coated on the other surface of the substrate, wherein an amount of compounds having a molecular weight of 1000 to 5000, as converted to polystyrene molecular weight, extracted with tetrahydrofuran and converted to a polystyrene extraction amount, per 3 $\mu$m thickness from the magnetic layer ($W_M$) and per 1 $\mu$m thickness of from the back coating layer ($W_B$), are both less than 200 mg/m$^2$, which tape has improved traveling stability and durability.

3 Claims, No Drawings

MAGNETIC RECORDING TAPE CONTAINING LOW LEVELS OF COMPOUNDS WITH MOLECULAR WEIGHTS BETWEEN SPECIFIED LIMITS DETERMINED FROM GEL PERMEATION CHROMATOGRAPHY OF TAPE EXTRACT

BACKGROUND OF THE INVENTION

1. Field of the Invention

The present invention relates to a magnetic recording medium comprising a magnetic layer and a back coating layer, on a substrate and more particularly, the present invention is directed to the improvement in the traveling stability and durability of a magnetic recording tape for video, audio or computer use which is set in a cassette and, in use, wound around a rotating drum which carries a magnetic head.

2. Description of the Related Art

In general, a magnetic tape is prepared by coating a magnetic paint comprising magnetic powder, a binder resin, an organic solvent and necessary additives on one surface of a substrate film, such as a polyester film, drying the coated paint to form a magnetic layer, coating a back coating paint comprising a non-magnetic powder, a binder resin, an organic solvent and necessary additives on the other or back surface of the substrate and drying the coated back coating paint to form a back coating layer. The magnetic tape is required to have good traveling stability and durability.

Heretofore, it has been believed that the traveling stability and durability of the magnetic recording tape was controlled by curing characteristics of the binder resin in the magnetic layer and/or film strength of the magnetic layer. Accordingly, many proposals have been made on evaluation of the curing characteristics of the binder resin and the surface strength of the magnetic layer. For example, as disclosed in Japanese Patent Kokai Publication No. 182546/1988, a magnetic recording tape having a magnetic layer comprising a binder resin cured with a curing agent is dipped in a solvent, such as a halogenated hydrocarbon, an ether or a ketone, and a relationship between extracted materials and an abraded amount of a ball in a scratch test is sought.

However, with such an evaluation method of the surface strength of the magnetic layer, stiffness of the magnetic recording tape can be evaluated but the traveling stability and durability cannot be accurately evaluated since tackiness on the tape surface is not taken into consideration. That is, with such an evaluation method, since the extracted materials are treated as a whole, it is impossible to distinguish low molecular weight compounds, such as lubricants which have actually good influence on the traveling stability, from other compounds. The above evaluation method cannot measure the amount of the components which deteriorate the traveling stability and durability and therefore does not necessarily reveal the relationship between the traveling stability and/or the durability and the surface strength of the magnetic layer. In other words, in the case of the magnetic recording tape having the magnetic layer with ideal surface strength, when the extracted materials include a component having a viscosity in a specific range, the magnetic layer has a high degree of tackiness and resistance between the magnetic recording tape and parts of a recording and reproducing equipment with which the magnetic recording tape come into contact. Thus, the traveling stability and durability are not satisfactorily improved. Accordingly, from the evaluation of the surface strength of the magnetic layer by the conventional method, the traveling stability and durability of the magnetic recording tape cannot be accurately evaluated, and the structure of the magnetic recording tape having an improved traveling stability and durability may not be clarified.

SUMMARY OF THE INVENTION

One object of the present invention is to provide a magnetic recording tape having improved traveling stability and durability.

Another object of the present invention is to provide a magnetic recording tape comprising a magnetic layer and a back coating layer both of which have reduced tackiness.

According to the present invention, there is provided a magnetic recording tape comprising a non-magnetic substrate, a magnetic layer which comprises magnetic powder and a binder resin and is coated on one surface of the substrate and a back coating layer which comprises non-magnetic powder and a binder resin and is coated on the other remaining surface of the substrate, wherein the amount of the compounds having a molecular weight of between 1000 to 5000, as converted to a polystyrene molecular weight, extracted with tetrahydrofuran and converted to a polystyrene extraction amount, per 3 $\mu$m thickness of the magnetic layer ($W_M$) and per 1 $\mu$m thickness of the back coating layer ($W_B$), are both less than 200 mg/m$^2$, preferably less than 150 mg/m$^2$.

The present invention is based on the following findings:

1. Tacky compounds which substantially deteriorate sliding between the magnetic recording tape and the sliding parts in the recording and reproducing equipment have molecular weights in the range from 1000 to 5000, as converted to polystyrene;

2. When a total amount of such tacky compounds exceeds 200 mg per m$^2$ of the magnetic recording tape, the sliding is deteriorated;

3. To achieve the stable traveling of the magnetic recording tape, the back coating layer does not stick to the sliding parts, in particular, guide pins of the recording and reproducing equipment.

DETAILED DESCRIPTION OF THE PRESENT INVENTION

In the usual magnetic recording tape, the amount of the binder resin in the magnetic layer is decreased to increase the proprotion of the magnetic powder. Therefore, the relation of the amounts of the extracted compounds is usually $W_B > W_M$ when the magnetic layer is a highly cross linked, one which is intended to achieve high durability. However, according to the present invention, $W_B$ is preferably not larger than $W_M$ ($W_B \leq W_M$). The reason for this is as follow:

In most types of video tape recorders, to stabilize traveling of the tape during recording and reproducing signals, just before the magnetic recording tape returns to the cassette from the recorder, the tape is sandwiched between a pinch roll on the magnetic layer and a capstan on the back coating layer and forwarded towards the cassette. In such a design, often, the pinch roll is made of rubber and the capstan is made of a metal so that the tape is reliably returned in the cassette from the recorder by the above mechanism. In this case, the metal capstan is driven by a motor rotary motion of the capstan is transmitted to a circumferential face of the rubber pinch roll which is opposite to the capstan. With rotation of the pinch roll, the driving force is transmitted to the magnetic layer side which contacts the center part of the circumferential face of the pinch roll, and the magnetic recording tape is drawn. When the back coating layer which contacts the capstan is more tacky than the magnetic layer, a part of the driving force from the capstan is transmitted to the tape directly through the back coating layer, so that a speed difference is generated between the magnetic layer side and the back coating layer side of the magnetic recording tape to cause slippage between one pair of the capstan and the pinch roll and, in turn, vibration.

In addition, in the case of the cassette type magnetic recording tapes which are widely used recently, since the back coating layer slidably contacts to many guides and pins during loading and traveling due to their structure, preferably the back coating is less tacky than the magnetic layer, that is, $W_B$ is not larger than $W_M$.

The kinds of the components to be extracted from the magnetic layer and the back coating layer with an organic solvent may be controlled by choosing, as the binder resin, a resin containing less components having a molecular weight of 1000 to 5000, as converted to polystyrene, or sufficiently cross linking the binder resin with the curing agent to reduce the components having low or middle molecular weights.

Any conventionally used binder may be used. Specific examples of the binder resin are vinyl chloride-vinyl acetate copolymers, polyvinylbutyral resins, cellulose resins, polyurethane resins, polyester resins, isocyanate compounds, radiation-curable resins and the like.

As the magnetic powder to be contained in the magnetic layer, any of the conventional magnetic powders may be used. Specific examples of the magnetic powder are $\gamma$-$Fe_2O_3$ powder, $Fe_3O_4$ powder, intermediate iron oxide powder between $\gamma$-$Fe_2O_3$ and $Fe_3O_4$, cobalt-containing $\gamma$-$Fe_2O_3$ powder, cobalt-containing $Fe_3O_4$ powder, $CrO_2$ powder, Fe powder, a metal powder mixture comprising Fe powder and other metal powder, Co powder, Ni powder, powder of alloys of these metals, barium ferrite powder, and the like.

As the non-magnetic powder to be contained in the back coating layer, any of the conventionally used ones may be used. Specific examples of the non-magnetic powder are $\alpha$-$Fe_2O_3$ powder, $Cr_2O_3$ powder, $Al_2O_3$ powder, $BaSO_4$ powder, $CaCO_3$ powder, MgO powder, $BaCO_3$ powder, ZnO powder, $Cu_2O$ powder, CuO powder, $Si_3N_4$ powder, SiC powder, $TiO_2$ powder, $MoS_2$ powder, $WS_2$ powder, carbonaceous powder (e.g. graphite and carbon black) and the like.

The magnetic recording tape of the present invention may be produced by a per se conventional method except that the binder resin is selected as described above. For example, the magnetic powder and the binder resin are dispersed in an organic solvent together with necessary additives to prepare a magnetic paint. The magnetic paint is coated on one surface of a substrate film, such as a polyester film by a conventional method such as a roll coater, and dried to form the magnetic layer. The non-magnetic powder and the binder resin are dispersed in an organic solvent together with necessary additives to prepare a back coating paint. Then, the back coating paint is coated on the other surface of the substrate film by the a conventional method and dried to form the back coating layer.

Any conventional organic solvent can be used to prepare the magnetic and back coating paints, Examples are toluene, methyl isopropyl ketone, methyl ethyl ketone, cyclohexanone, tetrahydrofuran, ethyl acetate and mixtures thereof.

PREFERRED EMBODIMENTS OF THE INVENTION

The present invention will be illustrated by the following examples, in which "parts" are by weight unless otherwise indicated.

EXAMPLE 1

The following components were thoroughly mixed in a sand grind mill:

| Component | Parts |
| --- | --- |
| $\alpha$-Fe magnetic powder (Specific surface area by the BET method: 50 $m^2/g$) | 100 |
| Hydrophilic group-containing vinyl chloride resin (MR-110 manufactured by Nippon Zeon) | 12 |
| Polyurethane resin (N-2309 manufactured by Nippon Polyurethane, average molecular weight: 50,000) | 8 |
| $\alpha$-Alumina (average particle size: 0.3 $\mu$m) | 8 |
| Carbon black (Ketchen Black EC manufactured by Akzo) | 2 |
| n-Butyl stearate | 2 |
| Stearic acid | 1 |
| Methyl isobutyl ketone | 60 |
| Cyclohexanone | 90 |
| Toluene | 150 |

Then, to the mixture, a trifunctional low molecular weight isocyanate compound (Colonate L manufactured by Nippon Polyurethane) (5 parts) and tin octylate (0.5 parts) were added and dispersed to obtain a magnetic paint.

The magnetic paint was coated on one surface of a polyester base film having a thickness of 10 $\mu$m to a dry thickness of 3 $\mu$m, subjected to an orientation treatment, dried and planished to form a magnetic layer.

Then, a back coating paint was prepared by mixing the following components:

| Components | Parts |
| --- | --- |
| Carbon black (Ketchen Black EC manufactured by Akzo) | 45 |
| Red oxide (average particle size: 0.3 $\mu$m | 5 |
| Nitrocellulose (Nitrocellulose H/1 manufactured by Asahi Chemical, polymerization degree: 100) | 20 |
| Polyurethane resin (N-2309 manufactured by Nippon Polyurethane, weight average molecular weight: 50,000) Trifunctional low molecular weight isocyanate compound (Colonate L manufactured by Nippon Polyurethane) | 20 |
| Methyl isobutyl ketone | 140 |
| Cyclohexanone | 140 |
| Toluene | 140 |

The back coating paint was coated on the other surface of the base film to a dry thickness of 1.0 $\mu$m and dried to from a back coating layer. The coated film was kept in a temperature-controlled room at 60° C. for 48 hours to effect cross linking. Then, the coated film was cut to a width of 8 mm to obtain a recording tape.

EXAMPLE 2

In the same manner as in Example 1 but using, as hydrophilic group-containing vinyl chloride resin, Eslec E (manufactured by Sekisui Chemical Industry, polymerization degree: 570) in place of MR-110 and no tin octylate, a magnetic tape was produced.

EXAMPLE 3

The following components were thoroughly mixed in a sand grind mill:

| Component | Parts |
| --- | --- |
| Co-cont. γ-Fe$_2$O$_3$ magnetic powder (Specific surface area by the BET method: 40 m$^2$/g) | 100 |
| Nitrocellulose (Nitroculloce H/1 manufactured by Asahi Chemical, weight average molecular weight: 50,000) | 12 |
| Polyurethane resin (N-2309 manufactured manufactured by Nippon Polyurethane, average molecular weight: 50,000) | 8 |
| α-Alumina (Average particle size: 0.3 μm) | 6 |
| Carbon black (Ketchen Black EC manufactured by Akzo) | 1 |
| n-Butyl stearate | 2 |
| Stearic acid | 1 |
| Methyl isobutyl ketone | 44 |
| Cyclohexanone | 66 |
| Toluene | 110 |

Then, to the mixture, a trifunctional low molecular weight isocyanate compound (Colonate L manufactured by Nippon Polyurethane) (5 parts) and tin octylate (0.5 parts) were added and dispersed to obtain a magnetic paint.

In the same manner as in Example 1 but using the above prepared magnetic paint, a magnetic tape was produced.

EXAMPLE 4

In the same manner as in Example 3 but using, as a polyurethane resin in the magnetic paint, CA-128 (manufactured by Morton Thiocol, weight average molecular weight: 100,000) in place of N-2309, a magnetic tape was produced.

EXAMPLE 5

In the same manner as in Example 1 but cross linking the resin in the magnetic layer at 60° C. for 24 hours after its formation and also cross linking the resin in the back coating layer after its formation at 60° C. for 24 hours, the magnetic tape was produced.

COMPARATIVE EXAMPLE 1

In the same manner as in Example 1 but using no tin octylate and eliminating the cross linking step, a magnetic tape was produced.

COMPARATIVE EXAMPLE 2

In the same manner as in Example 1 but using as the polyurethane resin in the back coating paint, ME-664 (manufactured by Mitsubishi Chemical, weight average molecular weight: 25,000) in place of N-2309, a magnetic tape was produced.

COMPARATIVE EXAMPLE 3

In the same manner as in Example 3 but using no tin octylate and eliminating the cross linking step, a magnetic tape was produced.

COMPARATIVE EXAMPLE 4

In the same manner as in Example 3 but using as a polyurethane resin in the back coating paint, ME-664 in place of N-2309, a magnetic tape was produced.

With each of the magnetic tapes produced in Examples and Comparative Examples, a total amount of the extracted components having the polystyrene converted molecular weight of 1000 to 5000 from the magnetic or back coating layers as converted to an extracted amount of polystyrene was measured by the GPC method.

To measure the amount of the components extracted from the magnetic layer, the back coating layer was removed from the tape. The tape of 380 cm$^2$ was dipped in tetrahydrofuran (2.5 ml) at 23°±2° C. for 24 hours. Then, the extract was subjected to GPC with using a differential refractometer as a detector after calibrating with a molecular weight and an extracted amount. Thereby, a molecular weight distribution was measured with the extracted components. In the separate step, a relationship between a concentration of a standard polystyrene solution and an area of signal strength from the differential refractometer was established. Then, the area of the signal strength for the components having the molecular weight of 1000 to 5000 in the extract was converted to the polystyrene amount from the above relationship.

To measure th amount of the components extracted from the back coating layer, the magnetic layer was removed from the tape and the amount of the extracted components was measured in the same manner as above.

With each of the magnetic tapes produced in Examples and Comparative Examples, traveling stability and durability were evaluated.

The traveling stability was evaluated by measuring tension and jitter when the tape was traveled in an 8 mm VTR according to the following criteria:

Tension

High: larger than 35 g
Middle: 25 to 30 g
Low: smaller than 25 g

Jitter

A: 0.1 to 0.15 μsec.
B: more than 0.15 μsec.

The durability was evaluated by loading the tape on the 8 mm VTR, traveling the tape 100 times at 40° C., 80% RH and observing contamination of a magnetic head of the VTR. The results were evaluated according to the following criteria:
A: No contamination
B: Slight contamination
C: Severe contamination The results are summarized in Table.

TABLE

| Example No. | Extracted amount (mg/m$^2$) | | Traveling stability | | Durability |
| --- | --- | --- | --- | --- | --- |
| | Magnetic layer | Back coating layer | Tension | Jitter | |
| 1 | 100 | 100 | Low | A | A |
| 2 | 150 | 100 | Low | A | A |
| 3 | 150 | 100 | Low | A | A |
| 4 | 120 | 100 | Low | A | A |
| 5 | 100 | 180 | Low | B | A-B |
| C. 1 | 300 | 250 | High | B | C |
| C. 2 | 120 | 300 | Middle | B | A-B |

TABLE-continued

| Example No. | Extracted amount (mg/m²) | | Traveling stability | | Durability |
|---|---|---|---|---|---|
| | Magnetic layer | Back coating layer | Tension | Jitter | |
| C. 3 | 450 | 250 | Middle | B | B |
| C. 4 | 200 | 300 | Middle | B | A-B |

As understood from the results of Table, the magnetic recording tapes of the present invention (Examples 1-5) had the extracted amount less than 200 mg/m². Therefore, they had smaller tension, substantially the same jitter in comparison with the magnetic recording tapes produced in Comparative Examples and caused no or slight contamination of the magnetic head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording tape comprising a non-magnetic substrate, a magnetic layer which comprises magnetic powder and a binder resin coated on one surface of said substrate and a back coating layer which comprises non-magnetic powder and a binder resin coated on the opposite surface of said substrate, wherein an amount of compounds having a molecular weight of 1000 to 5000, as converted to a polystyrene molecular weight, extracted with tetrahydrofuran at 23°±2° C. for 24 hours, and converted to a polystyrene extraction amount, per 3 μm thickness from the magnetic layer $W_M$ and per 1 μm thickness from the back coating layer $W_b$, are both less than 200 mg/m².

2. The magnetic recording tape according to claim 1, wherein $W_B$ is not greater than $W_M$.

3. The magnetic recording tape according to claim 1, wherein $W_B$ and $W_M$ are both less than 150 mg/m².

* * * * *